Oct. 15, 1940. W. O. PRAY 2,218,153
METHOD OF AND AN APPARATUS FOR EFFECTING HEAT TRANSFER FROM A
MOLTEN MATERIAL HEAT-CARRYING MEDIUM IN THE HEAT TREATMENT OF
SUBSTANCES IN THE GASEOUS AND VAPOROUS STATE
Filed Aug. 27, 1937     3 Sheets—Sheet 3

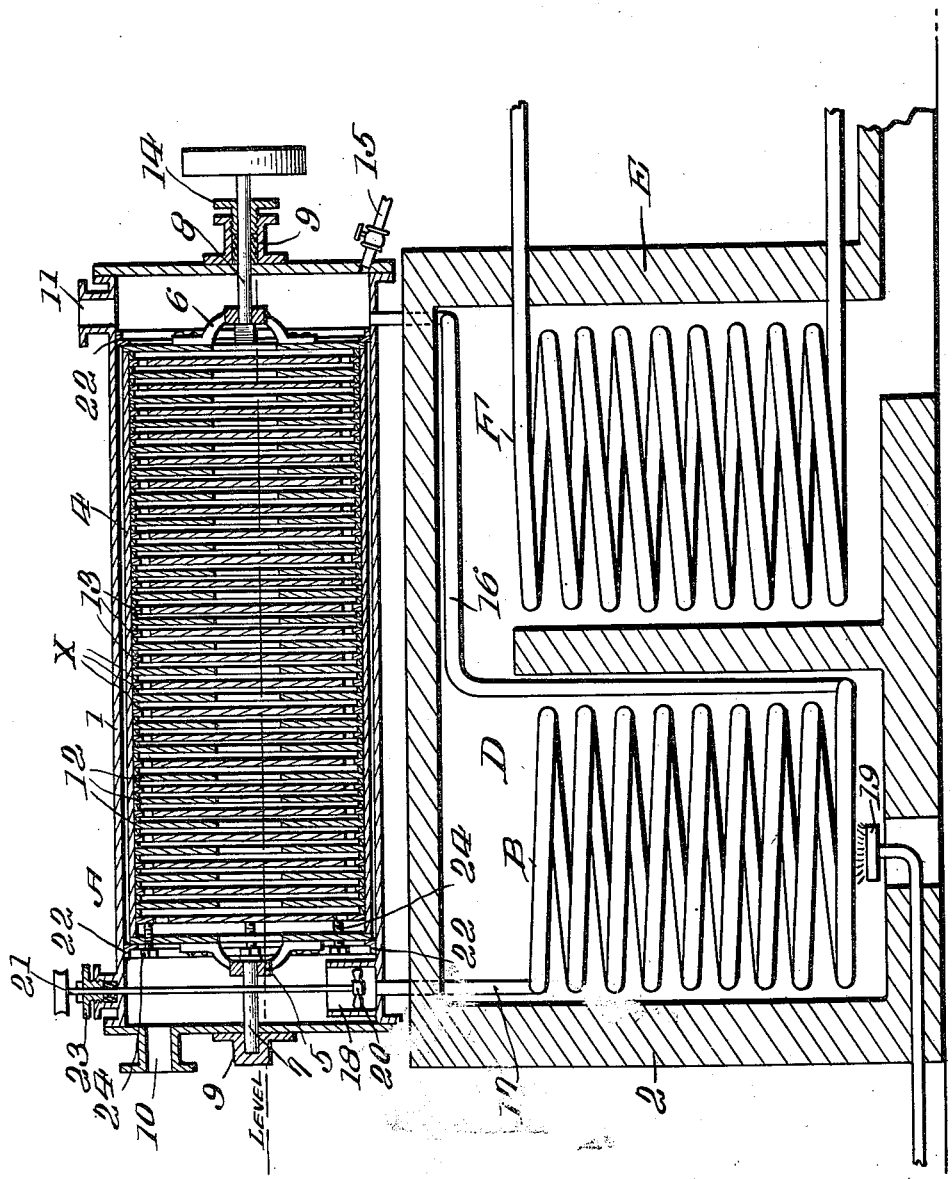

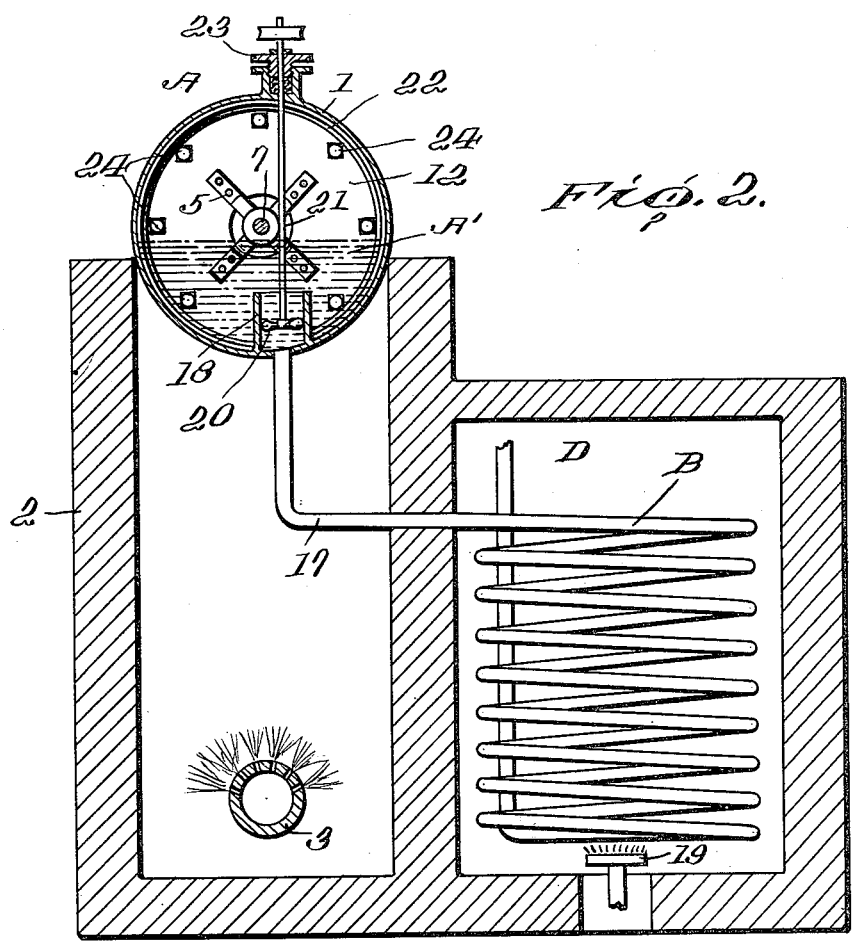
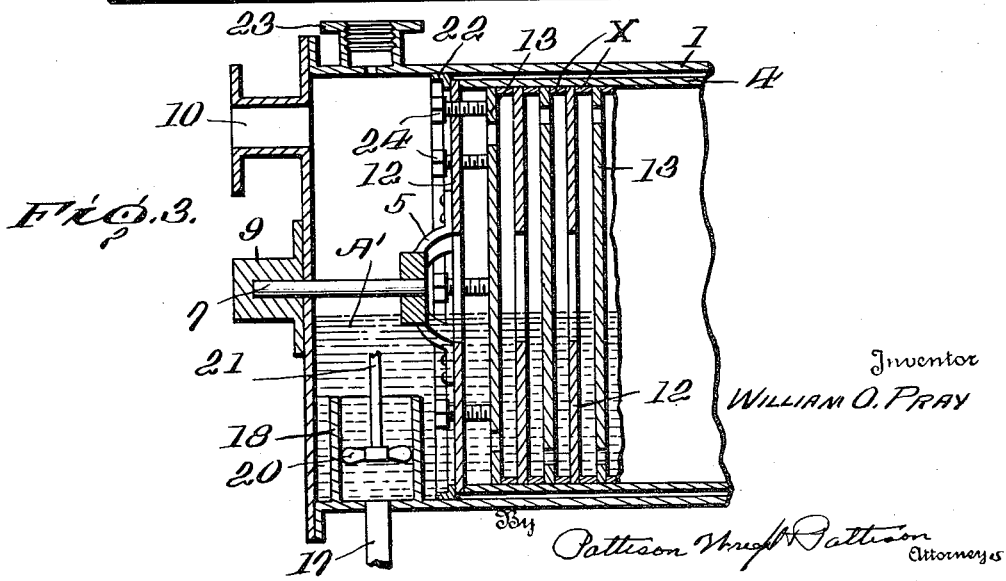

Inventor
WILLIAM O. PRAY

By Patteson Wright & Patteson
Attorneys

Patented Oct. 15, 1940

2,218,153

UNITED STATES PATENT OFFICE 2,218,153

METHOD OF AND AN APPARATUS FOR EFFECTING HEAT TRANSFER FROM A MOLTEN MATERIAL HEAT-CARRYING MEDIUM IN THE HEAT TREATMENT OF SUBSTANCES IN THE GASEOUS AND VAPOROUS STATE

William O. Pray, De Beque, Colo., assignor to Pray Research Corporation, De Beque, Colo., a corporation of Colorado Application August 27, 1937, Serial No. 161,352

13 Claims. (Cl. 257—1)

This invention relates to certain new and useful improvements in the method of and an apparatus for effecting heat transfer from a molten material heat-carrying medium in the heat treatment of substances in the gaseous and vaporous state and is related to the invention disclosed in my application Serial Number 724,430, filed May 7, 1934, Patent No. 2,100,355 issued Nov. 30, 1937, the object being to provide a method and an apparatus which will overcome the difficulties now existing in methods and apparatus now in use in heat treating substances in the vapor phase.

In my prior application I have disclosed a method and apparatus for effecting heat transfer from a molten material heat-carrying medium in the heat treatment of liquids not miscible with the heating medium. The present application covers a modification of the method and apparatus disclosed therein to adapt it to the heat treatment of gaseous and vaporous substances, with particular reference to those substances derived from mineral oils and other hydrocarbons as well as from various carbonaceous materials.

In general, the invention relates to the art of heat-treating substances in the vapor phase to convert them into other desired products, whether by thermal action alone or in conjunction with various solid and gaseous catalytic agents, the major purpose being to provide a new and improved method and apparatus wherein the heat necessary to promote and maintain the desired reactions may be applied under such exceptionally favorable thermal control that the generation of undesired end products, so difficult to avoid in present known methods, may be substantially reduced, and the operations in general rendered less difficult to carry out, practically and economically.

It is well known in the art that when gaseous and vaporous substances are heat-treated in the vapor phase to convert them into various desired products, many of the reactions require very high temperatures for their initiation, and at these temperatures the substances under treatment are extremely sensitive to temperature variations above or below normal reaction temperatures. It is known that relatively small variations in temperature sharply affect the velocity of reactions, the reaction speed doubling for each 18° F. rise in temperature. For this reason, when any portion of the vapor stream becomes overheated, due to local overheating of heat transfer surfaces, the reaction speed responds to the advance in temperature and if not quickly arrested, will result in the formation of a high proportion of undesired end products. Underheating fails to effect the desired conversion. Therefore the operations must be conducted within a narrow range of temperatures, and the application of heat must be uniform and under very definite control. The problem is to supply a definite quantity of heat within a definite period of time and simultaneously maintain the operating temperature within the safe temperature range. Where exothermic reactions are involved, there is the further necessity of removing excess heat from the reaction zone to prevent the acceleration of the reactions beyond the desired end, at the same time avoiding the premature arresting of the reactions through abruptly lowering the temperature before the desired conversion is accomplished.

Past experience has demonstrated that ideal thermal control for specific reactions is difficult to attain, particularly so where vaporous fluids are heated in tubular heating coils, wherein heat must be transmitted to the vapor stream from a highly heated furnace through the directly-fired walls of the tubing. The low heat conductivity of gaseous and vaporous fluids necessitates the maintenance of high furnace temperatures in order to heat the vapor to conversion temperature within the brief interval of time that the vapors may be permitted to remain in the zone of maximum temperature. High vapor velocities are necessary to accelerate heat transfer from the walls of the tubing to avoid the overheating of the metal exposed to the high radiant heat of the furnace. Split-second timing is essential under the conditions, and any interruption in heat transfer through variations in vapor velocity or through carbon accumulations on the heat transfer surfaces, will greatly alter the results, and possibly end in burnt out tubing and the temporary cessation of operations. It is an established fact that where vapor phase operations are conducted in directly-fired apparatus under high furnace temperatures, it is difficult to avoid the overheating of a portion of the vapors, and for this reason, operations so conducted usually result in the production of a considerable proportion of undesired end products, which under certain circumstances, render the operations unprofitable. Experience has further demonstrated that in numerous vapor phase operations, the employment of directly-fired heat transfer systems is either impractical, or their employment has been attended with so many difficulties as to make them uneconomical. Certain vapor phase reactions require extreme precision in the application of heat and the maintenance of uniform temperatures during the conversion period, and such conditions are difficult to attain in any directly-fired heat transfer system, consequently it has been necessary to employ indirect means of effecting heat transfer in carrying out such reactions.

The prior art discloses the efforts of many investigators to overcome the difficulties inherent to directly-fired heating systems by employing molten material as a heat-carrying medium to convey heat from the primary source and transmit it to the vaporous fluids without contacting them with the primary heating surfaces. In most of the heating systems in which molten material is thus utilized the transfer of heat to the vaporous fluids is accomplished by directly contacting them with surfaces of the molten material, whether by bubbling them through molten baths, flowing them in contact with thin streams of molten material or contacting them with atomized particles thereof. Methods of effecting the contact may differ, but the basic principle of heat transfer is the same. All are directed toward means of facilitating contact either by sub-dividing a mass of molten material or dispersing vaporous fluids therein.

Systems of this general type, which depend on direct physical contact to promote heat transfer, are of limited utility in large scale vapor phase operations because of numerous physical limitations which restrict their thermal capacity and make it difficult to control time and temperature relations. In the molten-bath type the vapors ascend through the bath under high velocity, affording only a brief contact with the molten material, and therefore, necessitating the employment of a volume of molten material out of all proportion to the thermal work accomplished. In order to attain reasonable thermal capacity, a high heat potential must be carried in the bath to compensate for the brief interval of contact. Further, owing to the great density of the material composing the bath, the vapors are not readily dispersed therein. Instead of spreading uniformly throughout the bath and ascending with uniform velocity, the vapors tend to seek the line of least resistance and follow channels created by varying currents and along the walls of the enclosing chamber. Frequently only a small proportion of the molten material is functioning as contemplated. These irregularities create serious difficulties where time and temperature relations must be closely adjusted, particularly so where the required heat additions necessitate a high heat potential in the molten material.

The present invention seeks to overcome these limitations by entirely dispensing with the principle of intimate contact and substituting therefor an improved method of facilitating heat transfer from the molten heat-carrying medium which will be more readily adaptable to the precise thermal requirements peculiar to vapor phase operations.

Instead of injecting a stream of vaporous fluids directly into a body of molten material and depending on direct physical contact to accomplish heat transfer while the vapors are dispersed therein, the present invention contemplates the employment of a plurality of positive heat transfer elements to continuously absorb heat from the interior of a substantial pool of molten material and continuously transfer the absorbed heat to a stream of vaporous fluids flowing above the horizontal surface of the molten material and in direct contact with the surfaces of the heat transfer elements. The purpose is to accelerate the outflow of heat from all parts of the mass of molten material under positive and definitely controllable conditions, and to transfer this heat to the vaporous fluids under similar positive conditions, in contradistinction to the hap-hazard conditions which prevail when vaporous fluids are injected into a bath of molten material and heat transfer is dependent on the uncertainties of direct physical contact.

A further object is to provide a heat transfer system which will permit of utilizing the heat-carrying capacity of the molten material to the maximum extent desired, and thus make it possible to accomplish a large amount of thermal work with a comparatively small volume of molten material. It is the purpose, through the employment of an extensive area of positive heat absorbing surfaces, to so accelerate the outflow of heat from the interior of the mass of molten material as to make it possible to increase the input of heat to any desired rate up to the heat-carrying capacity of the molten material at the particular operating temperature. A further purpose in the employment of these extensive heat absorbing and heat transfer surfaces is to interpose in the vapor stream such a large area of accurately heated surfaces, that heat transfer may be accomplished at a high rate without the necessity of maintaining an excessive heat differential between the molten material and the substances being treated.

In the most simple application of the method the gaseous and vaporous substances are passed through an enclosing chamber over the horizontal surface of a pool of molten material which is maintained at a predetermined temperature substantially above the temperature of the substances being treated by heat conducted through the bottom of the enclosing chamber. The transfer of heat from the molten material to the substances being treated is accomplished by alternately immersing and removing in the molten material a plurality of closely-spaced surfaces adapted to absorb heat contained therein and transfer it exteriorly thereof, causing these surfaces to absorb heat while immersed in the molten material, passing the heated surfaces into direct contact with the gaseous and vaporous substances as they flow over the horizontal surface of the molten material, and causing the transfer of heat to said substances directly from the heated surfaces.

This simple application of the heat transfer principle may be employed where the treatment of only a small volume of gaseous and vaporous substances is involved and in which relatively small heat additions are required. Where the treatment of a larger volume is contemplated, requiring relatively large additions of heat, the pool of molten material may be connected in circuit with a stream of similar molten material flowing through a heating zone, in which an extensive area of primary heating surfaces may be employed to continuously compensate the heat absorbed by the secondary heat transfer surfaces. The molten material, after passing through the heating zone, is introduced into one end of an elongated pool of molten material in which a plurality of transverse heat transfer surfaces are partly immersed. In passing through the enclosing chamber the molten material is repeatedly contacted with the series of surfaces interposed in its course, giving up a part of its stored heat to these surfaces, and finally being withdrawn from the opposite end of the molten pool to be returned to the heating zone, where its lost heat is restored before it again is released into the molten pool.

In a cyclic system such as described, in which the molten material flows continuously through the treating chamber, the withdrawal of heat takes place progressively as a result of successive contacts with the heat absorbing surfaces, which are transversely disposed in the direction of its flow. The heat absorbing surfaces are so arranged that they establish a series of narrow, connected channels, through which the molten material must flow on its way through the treating chamber, the walls of the channels comprising the heat absorbing surfaces. Due to the progressive absorption of heat from the pool of molten material as it flows through the treating chamber, a gradually decreasing temperature gradient is established in one direction through the pool, and a gradually increasing gradient in the opposite direction. By taking advantage of this occurrence, and without modifying the mode of heat transfer, it is possible to subject the vapors either to successive additions of heat at gradually rising temperatures by introducing them into the zone of lower temperature and flowing them counter current to the flow of molten material, or to subject them to sudden and rapid additions of heat by introducing them into the zone of maximum temperature and flowing them concurrent with the molten material toward the zone of minimum temperature.

Other and further objects and advantages of the invention will be hereinafter set forth and the novel features thereof set forth in the appended claims.

In the drawings:

Figure 1 is a longitudinal section, partly in elevation, showing diagrammatically one form of an apparatus for carrying out my improved method of effecting heat transfer from molten materials in the heat treatment of gaseous and vaporous substances;

Figure 2 is a vertical transverse section through Figure 1;

Figure 3 is a detail enlarged longitudinal section showing the compression screws and spacing rings for holding the discs in the proper position;

Figure 4:
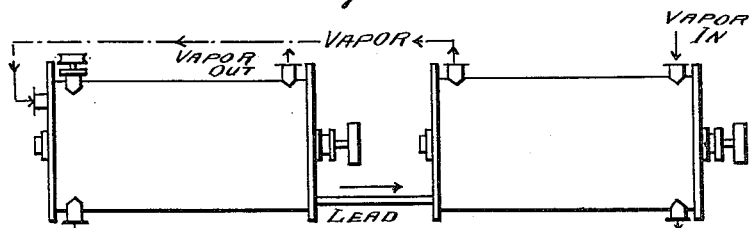
Figure 4 is a side elevation of a pair of heating chambers showing diagrammatically the flow of vapor entering the cooler end of the second chamber and passing into the hotter end of the first chamber.

In Figures 1 and 2 of the drawings I have shown one form of apparatus for carrying out my improved method of effecting heat transfer from a molten material heat-carrying medium in the heat treatment of gaseous and vaporous substances, in which a heat-treating or reaction chamber is generally indicated by the reference character A herein shown in the form of a stationary cylinder 1, in which a pool of molten material A' is continuously maintained at a predetermined level and in circuit with a steam of similar molten material flowing through a heating-coil B. Chamber A is set in a suitable furnace 2, heated by burner 3. The bottom of the chamber is preferably set high enough to bring it above the top of heating-coil B so that the molten material may be withdrawn from chamber A without disturbing the contents of the coil. The outer wall of the top half of chamber A may either be insulated (not shown) against the radiation of heat, or bricked in to permit a part of the furnace gases to pass around the wall and maintain it at the desired temperature.

Disposed within the stationary cylinder 1 is a cylinder 4, with central openings at each end, and provided with spiders 5 and 6 carrying trunnions 7 and 8 which revolve in suitable bearings 9 set in opposite ends of chamber A. For the purpose of illustration, these bearings are shown as simple bearings mounted in the ends of chamber A. Preferably, however, they should be mounted in a manner permitting insulation from the heat of the chamber and the use of cooling means known to the art. The diameter of cylinder 4 is slightly less than the interior diameter of cylinder 1, having sufficient clearance to permit it to revolve freely therein. Suitable seal rings 22 may be provided at each end of cylinder 4 to prevent the direct passage of vapors or molten material through the clearance space between the two cylinders 1 and 4. For convenience in illustration, the clearance space shown in the drawings is exaggerated. In actual construction, the rigidity of cylinder 4 permits of operating with a relatively small clearance, and as a small leakage through the clearance space would not be prejudicial in most operations, a tight sealing ring is not essential. In most cases, a single ring of simple construction, placed at one end of cylinder 4, will answer the purpose. Openings 10 and 11 in chamber A may be used interchangeably, as inlets or outlets for the passage of the gaseous and vaporous substances therethrough. A pump (not shown) may be used to force or draw the gases or vapor through the cylinders 1 and 4.

Rigidly mounted in cylinder 4 is a series of discs 12 and 13, spaced in alternate relation by spacing rings as shown at X. The discs may consist of sheet steel or other suitable metal or alloy. In operations requiring the use of catalyzing agents to promote the reactions, such as various metals, metallic oxides, mixtures of metals or alloys or other agents known to the art, the discs may advantageously consist of a suitable catalytic metal or alloy, or may consist of a metal, coated or plated with the desired metal, alloy, metallic oxide or other catalyzing agent. Discs 12 have a circular opening at the center to permit the passage of vapors and molten material therethrough. Discs 13 are closed at the center but have a plurality of openings around the periphery equivalent in combined area to the central openings of discs 12. The series of discs serve as a plurality of transverse baffles, with narrow channels between for the passage of gaseous and vaporous substances in a zig-zag path in the upper half of the cylinder 4, and the passage of the molten heat-carrying medium in a zig-zag path in the lower half thereof. The recurring changes in the position of the openings in alternate discs causes recurring changes in the course of the vapors and molten material through cylinder 4, first along a channel toward the periphery of the cylinder and back toward the center through the succeeding channel, and so on in a zig-zag relation, through alternating channels until they reach the end of the course. The general course of the molten material is set for one fixed direction, the hot material from the heater being fed into one end of chamber A and the partly cooled material being withdrawn from the opposite end. The gaseous substances may be caused to flow in either direction, concurrent or countercurrent to the flow of the molten material.

As cylinder 4 revolves, the discs revolve with it, and are continuously passed into and out of the molten material, the lower half being immersed in the molten material, while the upper half is in direct contact with the vaporous substances in the free space of the cylinder. The discs absorb heat while in the molten material and carry it into the vapor stream, giving up a part of the heat thereto while it sweeps over the exposed disc surfaces in its passage through the cylinder.

The discs are slightly less in diameter than cylinder 4, and are assembled in the cylinder by sliding them into position, with spacing rings between, and locking the assembly together, through frictional contact of the members, by mechanical pressure applied through screws 24 at one end of the assembly while the other end is pressed against the opposite head of the cylinder. If desired, the spacing rings may be cut into half circles to facilitate their assembly or removal in the cylinder. The rings consist of thin bands of metal, cut to a width according to the spacing width desired between the faces of opposite discs. When the assembled discs and rings are locked together by the pressure of screws 24, the rings close the clearance space between the circular edges of the discs and the interior wall of cylinder 4. Screws 24 are set in one head of cylinder 4, arranged in any desired number in a circle close to the periphery of the cylinder head. Obviously, other forms of discs may be used, as well as other means of fixing them in the cylinder. Discs with slotted or circular perforations, in staggered relation in alternate members, might be substituted if desired, with a wide choice in the arrangement of the openings, but it is believed the forms disclosed above are preferable for most operations. The discs may be spaced any distance apart by varying the width of the spacing rings. They may be spaced on gradually increasing centers to establish channels of increasing width, if desired, in order to allow for changes in volume of the vaporous substances without an undue change in velocity, or conversely, vapors traveling in the opposite direction may be forced through gradually decreasing channels under increased velocity. The width of the channels can be varied as desired by merely changing the width of the spacing rings.

One end of trunnion 8 extends through the head of cylinder A in packing gland 14, and may be revolved by any suitable mechanism (not shown) having variable speed control and means to reverse the direction of rotation or an oscillatory motion when desired. Ordinarily, cylinder 4 will be rotated in one continuous direction but may periodically, be reversed and given an oscillatory motion if desired. A valve controlled opening 15 permits draining the contents of chamber A. Pipe 16 connects chamber A with heating-coil B at its inlet. Pipe 17 connects the outlet of coil B with the bottom of chamber A leading to the propeller-well 18.

Heating-coil B is mounted in a furnace D, heated by burner 19 and pipe-coil F is mounted in economizer section E of furnace D and is heated by waste furnace gases from furnace D. It may be used to preheat the vaporous substances before they enter the chamber A or as a vaporizing coil to generate the vapors. Obviously, the economizer section may contain multiple coils arranged in any manner for various purposes known to those skilled in the art. Heating-coil B is shown for the purpose of illustration as a simple helical coil mounted vertically in furnace D. When the apparatus is in operation, a continuous stream of molten material passes through the coil, being withdrawn from one end of chamber A through pipe 16 and returned to the opposite end through pipe 17. Obviously, other types of coils and furnaces may be used for heating the molten material, but where only molten material is circulated through the coil, as in the present case, there is no necessity of employing the elaborate tubular heaters found necessary when heating gases and vapors directly through the walls of the tubing. I have found through extended experiments in the use of molten materials that the elimination of joints in coils and piping should be carried as far as possible, therefore, simplicity in design of coils and connections is desirable.

A propeller 20, mounted on shaft 21 within chamber A, rotates in well 18, pulling the molten material from one end of the pool in chamber A, through the heating zone, and discharging it over the rim of the well into the pool of molten material at the end opposite to that from which it has been withdrawn. Propeller-shaft 21 extends through the flanged opening at the top of chamber A in packing gland 23. It may be driven by any suitable mechanism (not shown) having variable speed control, which may be mounted in any suitable manner above the flanged opening. It is necessary to mount the assembly off-center to bring shaft 21 out of the path of trunnion 7.

In operating the apparatus above shown and described, the molten material used is preferably lead or one of its alloys, preferably tin. The particular metal or alloy to be used will depend on the range of temperature desired and the object to be attained. Molten lead is satisfactory for a range of temperatures from 700 to 1500 degrees F. When it is desired to operate at lower minimum temperatures suitable alloys may be substituted, the melting points and compositions of which are commonly known. Under certain conditions, other molten materials may be used, the choice of which is within the skill of those engaged in the art. The molten material most commonly used in vapor phase operations is molten lead, and has proven satisfactory in demonstrating the principles of the present invention.

In charging the apparatus with the molten metal, chamber A, heating-coil B and connections are first heated to the melting point of the metal by burners 3 and 19. A separate melting pot (not shown) may be used to fuse the metal, and is preferably a tight chamber in which moderate air pressure may be used to displace the molten metal and force it through a transfer pipe into chamber A, from whence it finds its way into coil B. Sufficient metal is transferred to fill the coil and form a pool in chamber A to about four-tenths its diameter, which is maintained during the operation of the apparatus.

In starting the apparatus from cold, after it has been charged with the molten metal, the burner under chamber A is started first, in order to allow ample time for the fusion of the large volume of metal in the chamber. Owing to the relatively small area of the heating surface of the chamber, the mass of metal therein requires more time for its fusion than the metal in the coil. The metal in the coil will fuse quickly, and if the coil and chamber were mounted in the same furnace, it would be difficult to fuse the large mass in the chamber without overheating the coil. Also, when the metal in the coil is heated it must have room for expansion, and if the metal in the chamber is not at the fusion point, it prevents the expansion of the metal in the coil and might result in rupturing the tubing.
No trouble has occurred in operating the system where these precautions have been taken. After chamber A has been brought to working temperature practically all heat but into the system is generated in furnace D and conducted through the walls of coil B into the stream of molten material circulating therein. The bottom of the chamber A is then fired only enough to prevent cooling by radiation.

When all of the metal in the system is sufficiently fluid, propeller 20 is started, and circulation of the molten metal through the system is established. Furnace D may then be rapidly fired until the system is brought to the desired working temperature. While this is being done, cylinder 4 is slowly rotated to bring the discs to the working temperature of the molten metal and to radiate heat in the free space of the chamber. The pool of molten material in chamber A has a transverse area many times that of the tubing in coil B and therefore, moves through the chamber at relatively slow velocity compared with the velocity of the metal in the coil.

As the stream of hot metal from the heating coil enters chamber A, it meets the first of the series of transverse discs in cylinder 4, becoming rapidly diffused through that part of the molten pool immediately adjacent thereto. As the metal slowly advances through the successive channels in cylinder 4, each successive disc absorbs a part of the heat stored therein, and the molten mass becomes progressively cooler as it flows toward the opposite extremity of the chamber, and each successive disc is of lower temperature than the preceding one. Conversely, the temperature gradient rises in the reverse direction, and the discs are of progressively higher temperatures in that direction. Thus, by introducing a stream of vapors into chamber A through opening 11 and flowing them countercurrent to the flow of the molten material, they may be progressively heated at gradually rising temperatures until they reach the zone of maximum temperature where the hot metal from the heater enters the chamber, at which point they are discharged from the chamber through opening 10. Each disc adds a small quantity of heat as the vapors pass through succeeding channels and sweep over the heated surfaces. Conversely, by introducing the vapor stream through opening 10, and flowing it concurrent with the flow of the molten metal, the vapors are immediately brought into contact with the hottest surfaces and receive rapid additions of heat until they reach a zone in the chamber where their temperature corresponds with the temperature of the discs and the molten metal. This condition of temperature equilibrium may be postponed, if desired, until the vapors have reached the end of the course, so that they may continue to receive small heat additions at a gradually diminishing rate without appreciable changes in temperature. This is desirable, where endothermic reactions occur, as it is necessary to continue to add small quantities of heat in order to compensate the heat taken up by the endothermic reactions. Thus, the vapor stream may rapidly be brought to conversion temperature in the zones of highest temperature, and may then be maintained at this temperature for a predetermined period of time to permit the reactions to continue until the desired degree of conversion is accomplished.

The temperature and volume of the molten metal entering chamber A in a given time determines the heat available in the system at the particular operating temperature. Where the temperature of the vapors entering the chamber is known, the heat necessary to raise a given volume of vapor to reaction temperature and supply the heat of reaction may be approximately calculated. The heat available in a given volume of molten metal at a given temperature also may be calculated. Then, knowing the volume of vapor to be treated in a given time; the temperature to which it is preheated before entering the conversion chamber; and the heat necessary to raise the vapor to reaction temperature and effect the desired degree of conversion, the total heat to be supplied to the system may be calculated with a reasonable accuracy. The volume of molten metal to supply this quantity of heat at the particular temperature differential, may then be calculated, and by delivering the molten metal to the conversion chamber at the required rate, the necessary heat supply may be continuously maintained.

It is known, of course, that where the treatment of complex mixtures of hydrocarbons is involved, the calculation of heat requirements is more or less approximate, but may be predetermined with sufficient accuracy for practical purposes. In the present invention, means are provided to quickly adjust the heating system to actual requirements by stepping up or down the heat input to the molten metal and the rate at which it is delivered to the conversion chamber. By varying the speed of the propeller, the velocity of the metal through the heating-coil may be varied over a wide range, and as the heat delivered to the furnace may be varied at will, the heat input to the metal in the coil is subject to close regulation. With the volume of metal delivered to the conversion chamber subject to similar close regulation, a definite quantity of heat may be made available in the conversion chamber in a predetermined period of time, and may be quickly adjusted to the heat requirements of the vapors passing through the chamber. Further control may be had by varying the volume of vapors delivered to the conversion chamber, and the temperature to which they are preheated before entering the chamber.

The large volume of metal in the molten pool provides an accumulator of substantial capacity for the continuous storage of heat, and the extensive submerged surfaces of the rotating discs provide means of quickly taking up this heat from all parts of the molten mass and as quickly imparting it to the vapors under treatment. The transfer of heat from the molten metal is so greatly accelerated that heat may be withdrawn from the accumulator as fast as supplied. Therefore, it is possible to utilize the heat-carrying capacity of the molten metal to a high degree, and to maintain a high rate of heat transfer while carrying a relatively low heat differential between the molten metal and the vapors being treated. Thus, a comparatively small volume of molten metal in the system is sufficient for a large volume of thermal work, and there is an equivalent reduction in the size of apparatus required. The heat input into the system per square foot of primary heating surface is exceedingly high, and high furnace temperatures may be maintained without fear of adverse results, because of the rapidity with which heat is withdrawn from the molten metal by the extensive surfaces of the rotating discs and the absence of any carbon-forming substances in the primary heating coil. By properly correlating all controllable factors, it is possible to establish and maintain exceptionally uniform thermal conditions in the reaction chamber, and to avoid to a large extent, the conditions that promote destructive reactions in directly-fired systems. In view of the comparatively small temperature difference between the heat-carrying medium and the vapors, and the presence of ample heat absorbing surfaces to take up heat as fast as it is supplied to the molten pool, the problem of overheated surfaces is not present. The disc surfaces cannot be heated above the maximum temperature carried by the molten metal, and as it is comparatively easy to maintain this temperature at any point desired, there is no problem here necessitating high vapor velocities and split-second timing to avoid overheating the vapor stream. In transferring heat from the molten metal to the vapors, it is not necessary to conduct the heat through an intervening plate or wall of metal. Heat is absorbed from the molten metal directly through the exposed surfaces of the discs in contact therewith, and the absorbed heat is released to the vapor stream directly from the same surfaces. The danger of burned surfaces through carbon accumulations is thus eliminated. Should a thin layer of carbon accidentally form on the disc surfaces, the carbon itself, will act as the heat absorbing and transfer surfaces, while the metal in the disc remains unaffected.

The absorption of heat from the molten metal and its transfer to the vapor stream is definite and progressive. The pool of molten metal is moved through the conversion chamber in a definitely established path and at a definite and controllable rate. The series of connected channels divide the pool of molten metal into a plurality of narrow sections, each of which is in contact with the heat absorbing surfaces which form the walls of the channels. The molten metal in each section sweeps continuously over the surfaces of the heat absorbing elements, and as these surfaces are also in continuous motion, the conditions are exceptionally favorable for the rapid and progressive absorption of heat. Similar conditions prevail for the transfer of the absorbed heat to the vapor stream as it sweeps through successive channels in direct contact with the heat absorbing surfaces, which now function as heat transfer surfaces and deliver the absorbed heat directly to the vapor stream. The thorough and continuous mixing of the vapors, while moving in a stream of narrow cross-section through successive channels, brings all parts of the vapor stream into repeated contact with the extensive surfaces of the heat transfer elements, thus assuring rapid heat transfer under closely controlled conditions. A high transfer rate may be continuously maintained without employing a high heat differential between the heating medium and the substances being treated.

The present invention provides a heat transfer system so flexible in the control of temperatures, rate of heat transfer and time of treatment, that it may be adapted to an unusually wide range of vapor phase operations and to the treatment of a corresponding range of gaseous and vaporous substances. It may be employed for the mere superheating of steam and various heat-carrying gases, or for the preheating of gases and vapors to prepare them for further treatment at higher temperatures. Mixtures of gases and vapors, with or without steam or other active gaseous agents, may be treated under a wide range of thermal conditions, for the production of various derivatives.

Conversion may be attained by thermal action alone or in conjunction with the use of suitable catalytic or reactive materials. Where thermal action only is desired, the heat-transfer elements may be composed of non-active material and employed solely to bring the gaseous and vaporous substances to reaction temperature and supply the necessary heat of reaction to attain the desired degree of conversion. Where the presence of solid catalytic material is required to direct or accelerate the reactions, the heat-transfer elements may be composed of, or surfaced with a suitable active material, and will then function as catalytic as well as heat-transfer surfaces.

The molten metal in chamber A may be maintained as a stationary pool, and the separate heating and circulating system for the metal dispensed with, heat being supplied to the molten pool through the walls of the chamber exposed to the direct heat of the furnace. While the heating capacity of the system is reduced through the elimination of the cyclic heating system, the mode of effecting heat transfer from the molten pool to the gaseous and vaporous substances is retained, and the vapors may be exposed to an extensive area of accurately heated surfaces under close thermal control. Heat flow from the furnace to the vapors may be greatly accelerated through the employment of the extensive area of heat absorbing surfaces to transfer the heat from the molten metal as fast as it is transmitted by the primary heating surface, thus permitting of a relatively high rate of heat transfer without maintaining an excessive heat differential between the heating medium and the substances being treated.

Operations may be conducted under super-atmospheric pressure as well as atmospheric pressure, as desired, as pressures are equalized throughout the system, whether the molten metal is maintained in cyclic circulation through a separate heating zone, or a stationary pool of molten metal is maintained in the reaction chamber without the circulatory system. The circulation of the molten metal is not affected by the change in pressure.

Figure 5:
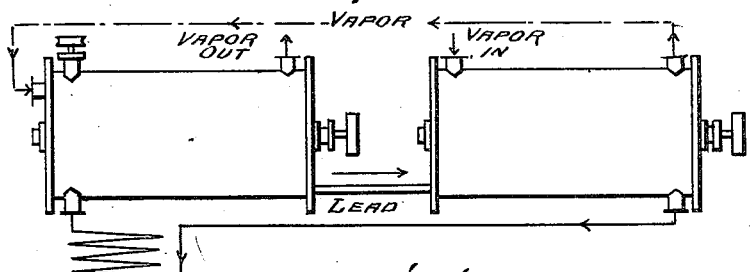
Figure 5 is a side elevation of a pair of heating chambers showing diagrammatically the vapor entering the hot end of the second chamber and the hot end of the first chamber.
Figure 6:
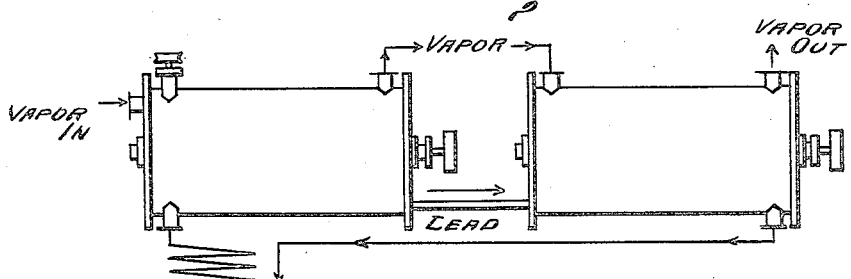
Figure 6 is a side elevation of a pair of heating chambers showing the vapor entering the hot end of the first chamber and passing into the hot end of the second chamber.
Figure 7:
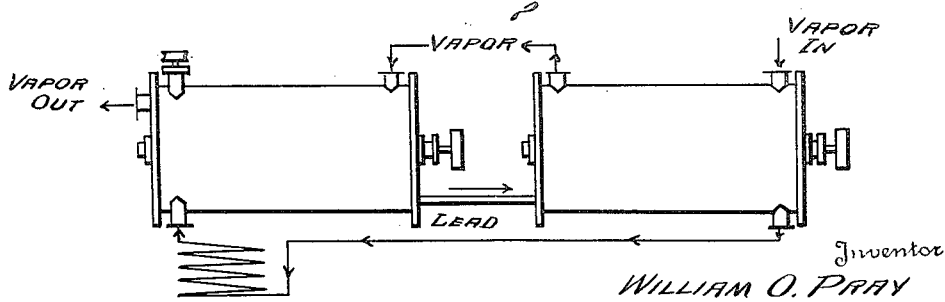
Figure 7 is a side elevation of a pair of heating chambers showing diagrammatically the vapor entering the cooler end of the second chamber and passing into the cooler end of the first chamber.

While in the drawings a single heating-chamber is shown in combination with pipe-coil B, it is obvious that two or more such chambers may be employed in series, the lower part thereof being connected to permit the molten metal to flow in a continuous direction through the series of chambers, while the vapor connections in the upper part may be varied to permit of varying the course of the vapor stream in the different chambers as desired. For example, as shown in Figures 4, 5, 6 and 7; two chambers may be connected to permit the flow of the molten metal continuously through both chambers, the hot metal from the heating-coil entering at one end of the first chamber, and the partly-cooled metal being withdrawn from the opposite end of the second chamber, and from there, being returned to the first chamber after passing through the heating-coil, a single propeller being employed to effect the circulation. The vapors may enter at the hot end of the first chamber, and flow in current with the molten metal through both chambers, as shown in Figure 6, or they may enter at the cooler end of the second chamber and flow in a continuous direction toward the hot end of the first chamber, counter-current to the flow of the molten metal, as shown in Figure 7. Again, as shown in Figure 4, they may enter the cool end of the second chamber and flow toward the opposite end, counter-current to the molten metal, and then, may be transferred to the hottest end of the first chamber and flow in current with the molten metal to the opposite end; or, as shown in Figure 5, the course may be from the hotter end of second chamber toward the cooler end, and then to the hottest end of first chamber and toward the cooler end thereof, the course in both chambers being in current with the flow of the molten metal. Obviously, other such variations in the vapor flow are possible; and, when employing several chambers in series, steam or other gaseous fluids may be superheated in one chamber; vapors may be dried and preheated in another chamber; and the combined vapors and gases may be treated together in a third chamber, in the order named, the heat for the various steps being drawn from the stream of molten metal flowing continuously through the interconnected chambers.

Numerous such combinations are possible, and while I have disclosed a desirable form of apparatus for carrying out the basic features of the invention, other forms of apparatus may be employed without departing from the basic principle of heat transfer herein disclosed, which comprises in a broad sense, the employment of a plurality of positive heat transfer elements to absorb heat from the interior of a substantial body of molten material and transfer it exteriorly thereof to a stream of gaseous or vaporous substances, which are caused to flow above the horizontal surface of the molten material in direct contact with the heated surfaces of the heat-transfer elements.

Further, while I have disclosed molten lead as one type of fusible metal that may be employed as a heat-carrying medium, I do not wish to be limited to any particular fusible metal or combination of metals, nor to the employment of fusible metals exclusively. While fusible metals are desirable in most operations involving the treatment of gaseous and vaporous substances, because heat transfer elements may be employed which are not wetted when immersed therein, it is not essential in all vapor phase operations that the heat-carrying medium be of non-wetting character. Fusible salts or mixtures thereof, may be employed under certain circumstances, where the presence of a thin film of the salt on the heat transfer elements is not objectionable, therefore, the expression "molten material," as used herein and in the claims, is intended to include any suitable metal, alloy of various metals, as well as salts or mixtures of various salts, the presence of which will not be prejudicial in the treatment of a particular substance.

While in the drawings I have failed to show any particular means for securing the heads of the cylinder 4 in position, it is, of course, understood that any of the conventional means now in use can be employed and that the pressure means for securing the discs in position can be installed at both ends of the cylinder if desired.

While I have illustrated an apparatus constructed in a particular manner with transversely disposed heat transferring surfaces, I wish it to be clearly understood that I do not wish to limit myself to the particular construction of apparatus or the particular construction of heat transfer surfaces as I am aware that these surfaces could be disposed longitudinally of the cylinder so as to transfer the heat to the vapor passing through the cylinder without departing from the spirit of my invention.

What I claim is:

1. An apparatus for the heat treatment of gaseous and vaporous substances comprising a horizontally disposed elongated chamber adapted to contain a body of molten material in the lower side thereof, a movably mounted cylinder arranged within said chamber having openings at each end thereof for the ingress and egress of vaporous fluids and molten material, a plurality of spaced discs transversely mounted within said cylinder provided with staggeredly arranged openings to permit the passage therethrough of molten material and vaporous fluids in independent zig-zag paths, a body of fusible material arranged within said chamber, means to fuse said material and maintain it at a predetermined temperature, said chamber being provided with an inlet at one end and an outlet at the other end, conduits in communication with the inlet and outlet of said chamber, a heating coil in said conduits, a propeller movably mounted at one end of said chamber to cause the molten material to circulate through said chamber and heating coil, means for alternately immersing and removing portions of said cylinder and discs in said molten material to absorb heat therefrom and transmit it exteriorly thereof, means to cause the stream of gaseous and vaporous fluids to flow through said discs in a zig-zag path in contact with the surface thereof to cause the transfer of heat from said discs to the gaseous and vaporous fluid passing therethrough.

2. An apparatus for the heat treatment of substances in a gaseous or vaporous state comprising a horizontally disposed elongated chamber adapted to contain a body of molten material maintained at a predetermined level, a movably mounted cylinder arranged within said chamber having openings at each end thereof for the ingress and egress of vaporous fluid and molten material, a plurality of spaced discs transversely arranged within said cylinder provided with staggeredly arranged openings to permit the passage therethrough of molten material and vaporous fluids in independent zig-zag paths, a heating coil in communication with the molten material within said chamber, means for circulating said molten material through said chamber and coil and means for circulating a stream of vapor through said chamber and discs in a zig-zag path to cause the positive transfer of heat from the surface of said molten material and the surface of said discs to the stream of vapor passing therethrough.

3. An apparatus for the heat treatment of substances in a gaseous or vaporous state comprising a closed chamber in which molten material is adapted to be maintained at a predetermined level, means for initially heating said molten material, a heating coil in communication with said molten material within said chamber, means for circulating molten material through said chamber and coil, a plurality of spaced discs having alternately arranged apertures adapted to move transversely within said chamber and having a portion thereof submerged within said molten material, said apertures being out of longitudinal alignment, said molten material moving in a zig-zag path through said chamber and means for passing a stream of vapor through said chamber and the apertures of said discs for causing said vapors to travel over the surfaces of said discs in a zig-zag path through said chamber towards and away from the surface of said molten material.

4. An apparatus for the heat-treatment of gaseous and vaporous substances comprising a horizontally disposed elongated chamber adapted to contain a body of molten material in the lower part thereof, a revolubly mounted cylinder within said chamber having openings at each end thereof for the ingress and egress of vaporous fluids and molten material, a plurality of spaced discs transversely mounted within said cylinder, openings in said discs to permit the passage therethrough of molten material and vaporous fluids, said openings alternating in successive discs at the center and periphery thereof, a body of fusible material within said chamber, means to fuse said material and maintain it at a predetermined temperature, an inlet at one end of said chamber and an outlet at the other end, a conduit in communication with the inlet and outlet, a heating coil in said conduit, a propeller movably mounted at one end of said chamber to cause the molten material to circulate in a zig-zag path through said chamber and heating coil, means to alternately immerse and remove said cylinder and discs in said molten material to absorb heat therefrom and transfer it exteriorly thereof, means to cause a stream of gaseous and vaporous fluids to flow through said discs and in contact with the surfaces thereof to cause the transfer of heat from said discs to the gaseous and vaporous substances.

5. An apparatus for the heat treatment of substances in the gaseous or vaporous state comprising a horizontally disposed elongated chamber containing a body of fusible material in the lower part thereof, an inlet at one end of said chamber and an outlet at the other end for the ingress and egress of molten material, a conduit including a heating coil filled with similar molten material in communication with the inlet and outlet, means to heat said conduit and coil, a propeller movably mounted at one end of said chamber to cause the molten material to circulate through said chamber and coil at a predetermined velocity, an inlet and outlet in said chamber for the passage of vaporous fluids, a rotatably mounted cylinder within said chamber having openings at each end for the circulation therethrough of the molten material and vaporous fluids, a plurality of disc-shaped baffles mounted at spaced points within said cylinder with their flat surfaces transverse to the longitudinal axis thereof, the spaces between said baffles forming a series of transverse channels for the travel of the molten material and vaporous fluids through said cylinder, and the flat surfaces of the baffles providing a plurality of heat transfer surfaces to absorb heat from the molten material flowing in the lower part of said channels and transfer it to the vaporous fluids flowing through the same channels above the surface of the molten material, openings in said baffles to interconnect said channels, said openings being positioned alternately in successive baffles at the center and periphery thereof to cause said molten material and vaporous fluids to travel through the series of interconnected channels in zig-zag fashion from and toward the central axis of said cylinder, means to revolve said cylinder to alternately immerse and remove said baffles in the molten material to cause them to absorb heat while immersed therein and transfer it exteriorly thereof to said vaporous fluids in a plurality of successive steps as they flow through said cylinder above the surface of the molten material.

6. An apparatus for the heat treatment of substances in the gaseous or vaporous state comprising a horizontally disposed elongated chamber containing a body of fusible material in the lower part thereof, an inlet at one end of said chamber and an outlet at the other end for the ingress and egress of molten material, a conduit including a heating coil filled with similar molten material in communication with the inlet and outlet, means to heat said conduit and coil, a propeller movably mounted at one end of said chamber to cause the molten material to circulate through said chamber and coil at a predetermined velocity, an inlet and outlet in said chamber for the passage of vaporous fluids, a rotatably mounted cylinder within said chamber having openings at each end for the circulation therethrough of the molten material and vaporous fluids, a plurality of disc-shaped baffles mounted at spaced points within said cylinder with their flat surfaces transverse to the longitudinal axis thereof, the spaces between said baffles forming a series of transverse channels for the travel of the molten material and vaporous fluids through said cylinder, and the flat surfaces of the baffles providing a plurality of heat transfer surfaces to absorb heat from the molten material flowing in the lower part of said channels and transfer it to the vaporous fluids flowing through the same channels above the surface of the molten material, openings in said baffles to interconnect said channels, said openings being positioned alternately in successive baffles at the center and periphery thereof to cause said molten material and vaporous fluids to travel through the series of interconnected channels in zig-zag fashion from and toward the central axis of said cylinder, means to space and fix said baffles within said cylinder to facilitate the insertion and removal thereof, and sealing means at each end of said cylinder to prevent the passage of molten material and vaporous fluids through the clearance between said cylinder and the enclosing chamber.

7. An apparatus for the heat treatment of gaseous and vaporous substances comprising a chamber in which molten material is adapted to be circulated and maintained at a predetermined temperature, a cylinder revolubly mounted in said chamber having open ends through which the molten material is adapted to flow and be maintained at a predetermined level, means for passing a volume of gaseous and vaporous substances through said chamber and cylinder and a plurality of discs having alternately positioned apertures disposed in said cylinder to cause the vaporous and gaseous substances and the molten material to travel in a zig-zag path towards and away from the longitudinal center of said cylinder.

8. An apparatus for the heat treatment of gaseous and vaporous substances comprising a horizontally disposed chamber adapted to contain molten material, a cylinder revoluble in said chamber, means for circulating the molten material through said cylinder, means for passing a stream of gaseous or vaporous substances through said chamber and cylinder and a plurality of spaced apertured discs fixed in said cylinder through which molten material and gaseous and vaporous substances pass in their passage therethrough.

9. An apparatus for heat treatment of gaseous and vaporous substances comprising a revolubly mounted cylinder in which a pool of molten material is adapted to be maintained at a predetermined level, means for circulating said molten material therethrough, means for passing a volume of gaseous and vaporous substances through said cylinder and a plurality of spaced foraminous discs fixed in said cylinder through which the molten material and the gaseous and vaporous substances pass in their passage therethrough.

10. An apparatus for the heat treatment of gaseous and vaporous substances comprising a chamber in which molten material is adapted to be circulated and maintained at a predetermined level; a cylinder revolubly mounted in said chamber having open ends through which the molten material is adapted to flow and be maintained at a predetermined level, means for passing the volume of gaseous and vaporous substances through said chamber and cylinder and a plurality of discs having alternately arranged apertures for causing the vaporous and gaseous substances to pass through said cylinder in a narrow stream moving toward and away from the longitudinal center of said cylinder.

11. A method of effecting heat transfer from a molten material heat-carrying medium in the heat treatment of substances in a gaseous or vaporous state without dispersing the substances in the molten material or contacting them with subdivided particles thereof which comprises maintaining a continuous flowing pool of molten material at a predetermined level in a closed chamber at a temperature substantially above the temperature of the substances being treated, circulating a continuous stream of molten material through said chamber, flowing a regulated volume of gaseous and vaporous substances in a continuous direction through said chamber above the horizontal surface of the molten pool in narrow zig-zag streams, moving toward and away from the molten pool and then transferring heat alternately absorbed from direct contact with said pool of molten material into direct contact with the entire exposed surfaces of said stream of gaseous and vaporous substances as it flows through said chamber.

12. The method of facilitating heat transfer from a molten material heat-carrying medium to a confined flowing stream of a gaseous fluid, which comprises passing said stream over the upper surface of a pool of molten material maintained at a temperature substantially above the temperature of the gaseous fluid, transmitting a part of the heat requirements of said fluid by direct transfer of heat from the upper surface of the molten material to the gaseous fluid in direct contact therewith, simultaneously effecting the positive transfer of additional heat to said fluid from within said pool of molten material without submerging the gaseous fluid therein or passing it through the molten material, by alternately immersing in and removing from said molten material, a plurality of spaced surfaces adapted to absorb heat from the pool and transfer it exteriorly thereof, and causing said stream of gaseous fluid to flow in a zigzag path upwardly and downwardly past said surfaces and into contact with the molten material.

13. An apparatus for heat-treating gaseous fluids comprising a vessel in which molten material is adapted to be maintained at a predetermined level, means for initially heating the same, a second heating means in communication with said molten material within said vessel, means for circulating said molten material through said vessel and second heating means, and means including rotary baffle elements arranged transversely within said vessel with portions thereof submerged within said molten material for causing a stream of gaseous fluid flowing through the vessel above the molten material to flow in a zigzag path upwardly and downwardly past said elements and into contact with the molten material.

WILLIAM O. PRAY.